United States Patent
Lee et al.

(10) Patent No.: US 12,498,760 B2
(45) Date of Patent: Dec. 16, 2025

(54) DISPLAY DEVICE INCLUDING SLIDABLE STRUCTURE

(71) Applicant: LG Display Co., Ltd., Seoul (KR)

(72) Inventors: ShinSuk Lee, Gimpo-si (KR); Junho Yun, Seoul (KR)

(73) Assignee: LG Display Co., Ltd., Seoul (KR)

( * ) Notice: Subject to any disclaimer, the term of this patent is extended or adjusted under 35 U.S.C. 154(b) by 189 days.

(21) Appl. No.: 18/370,855

(22) Filed: Sep. 20, 2023

(65) Prior Publication Data

US 2024/0176389 A1 May 30, 2024

(30) Foreign Application Priority Data

Nov. 30, 2022 (KR) .......... 10-2022-0165150

(51) Int. Cl.
  *G06F 1/16* (2006.01)
(52) U.S. Cl.
  CPC .......... *G06F 1/1652* (2013.01); *G06F 1/1624* (2013.01)
(58) Field of Classification Search
  CPC .. G06F 1/1652; G06F 1/1624; H04M 1/0237; H04M 1/0268
  See application file for complete search history.

(56) References Cited

U.S. PATENT DOCUMENTS

| | | |
|---|---|---|
| 2019/0268455 A1 | 8/2019 | Baek et al. |
| 2022/0078270 A1 | 3/2022 | Song et al. |
| 2022/0150337 A1 | 5/2022 | Lee et al. |
| 2022/0155823 A1 | 5/2022 | Shin et al. |
| 2023/0297143 A1* | 9/2023 | Kim ...................... G06F 1/1637 361/679.01 |

FOREIGN PATENT DOCUMENTS

| | | |
|---|---|---|
| EP | 4227760 A | 8/2023 |
| KR | 10-2022-0068872 A | 5/2022 |

OTHER PUBLICATIONS

Office Action issued in corresponding German Patent Application No. 10 2023 125 899.0, dated Jun. 3, 2024.

* cited by examiner

*Primary Examiner* — James Wu

(74) *Attorney, Agent, or Firm* — Morgan, Lewis & Bockius LLP

(57) ABSTRACT

A display device includes a display panel, a frame disposed on a back surface of the display panel, slidable plate disposed to overlap, at least in part, the frame, a slidable structure includes a plurality of roll belts, and a support guide disposed between the frame and the slidable plate. Each of the plurality of roll belts includes a bar extending in a straight line and a ring extending from one surface of the bar and providing an accommodation hole to which the support guide is coupled.

14 Claims, 12 Drawing Sheets

DISPLAY DEVICE INCLUDING SLIDABLE STRUCTURE

CROSS-REFERENCE TO RELATED APPLICATIONS

This application claims the priority of Korean Patent Application No. 10-2022-0165150 filed on Nov. 30, 2022, in the Korean Intellectual Property Office, the disclosure of which is incorporated herein by reference.

BACKGROUND

Technical Field

The present disclosure relates to a display device, and more particularly, to a slidable display device that can suppress lift-off of a display module.

Description of the Related Art

As an information age enters, the field of display devices for visually displaying electrical information signals is rapidly developing. Thus, studies for developing performances such as thinning, weight reduction, and low power consumption have continued.

Representative examples of the display devices include a liquid crystal display (LCD) device, a field emission display (FED) device, an electro-wetting display (EWD) device, an organic light emitting display (OLED) device, and the like.

An electroluminescence emitting display device represented as the OLED device is a self-emitting display device and does not require a separate light source unlike the LCD device. Thus, the electroluminescence emitting display device can be manufactured in a lightweight and thin form. Further, the electroluminescence emitting display device is not only advantageous in terms of power consumption by low voltage driving, but also has excellent color expression ability, response speed, viewing angle and contrast ratio (CR). Therefore, the electroluminescence emitting display device is expected to be utilized in various fields.

SUMMARY

Accordingly, embodiments of the present disclosure are directed to a display device that substantially obviates one or more of the problems due to limitations and disadvantages of the related art.

An aspect of the present disclosure is to provide a display device that is slidable and can suppress lift-off and resultant crease of a display module.

Another aspect of the present disclosure is to provide a display device that can solve a difference in luminance when a display panel is lifted off, and a decrease in touch sensing capability and an operation failure. The decrease in touch sensing capability and the operation failure may occur when the display device is touched, and the lifted part of the display panel is pressed.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, the display device comprises a display panel including a first area, a second area and a third area between the first area and the second area. Also, the display device includes a frame disposed on a back surface of the display panel to overlap the first area. Further, the display device includes a slidable plate disposed to overlap, at least in part, the frame and configured to slide in a first mode and a second mode. Furthermore, the display device includes a slidable structure whose one side is connected to a side surface of the frame and which includes a plurality of roll belts which overlaps the third area and is spaced apart from each other at a predetermined distance in one direction on the back surface of the display panel. Also, the display device includes a support guide disposed between the frame and the slidable plate. Each of the plurality of roll belts includes a bar extending in a straight line and a ring extending from one surface of the bar and providing an accommodation hole to which the support guide is coupled.

Other detailed matters of the exemplary embodiments are included in the detailed description and the drawings.

According to the present disclosure, a display device includes a slidable structure. Thus, it is possible to provide a slidable display device.

According to the present disclosure, the display device includes a support guide coupled to the slidable structure. Thus, when the display device is slid, a display panel is not lifted off, but can be stably supported.

According to the present disclosure, the display device suppresses lift-off and resultant crease of the display panel. Thus, it is possible to solve the problems, such as a decrease in touch sensing capability and an operation failure, occurring when the display panel is lifted off and the display device is touched.

According to the present disclosure, the display device further includes a support member disposed under the display panel to support the display panel. The support member disposed in a sliding area includes a plurality of openings and thus supports the display panel stably and imparts flexibility to the display panel.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
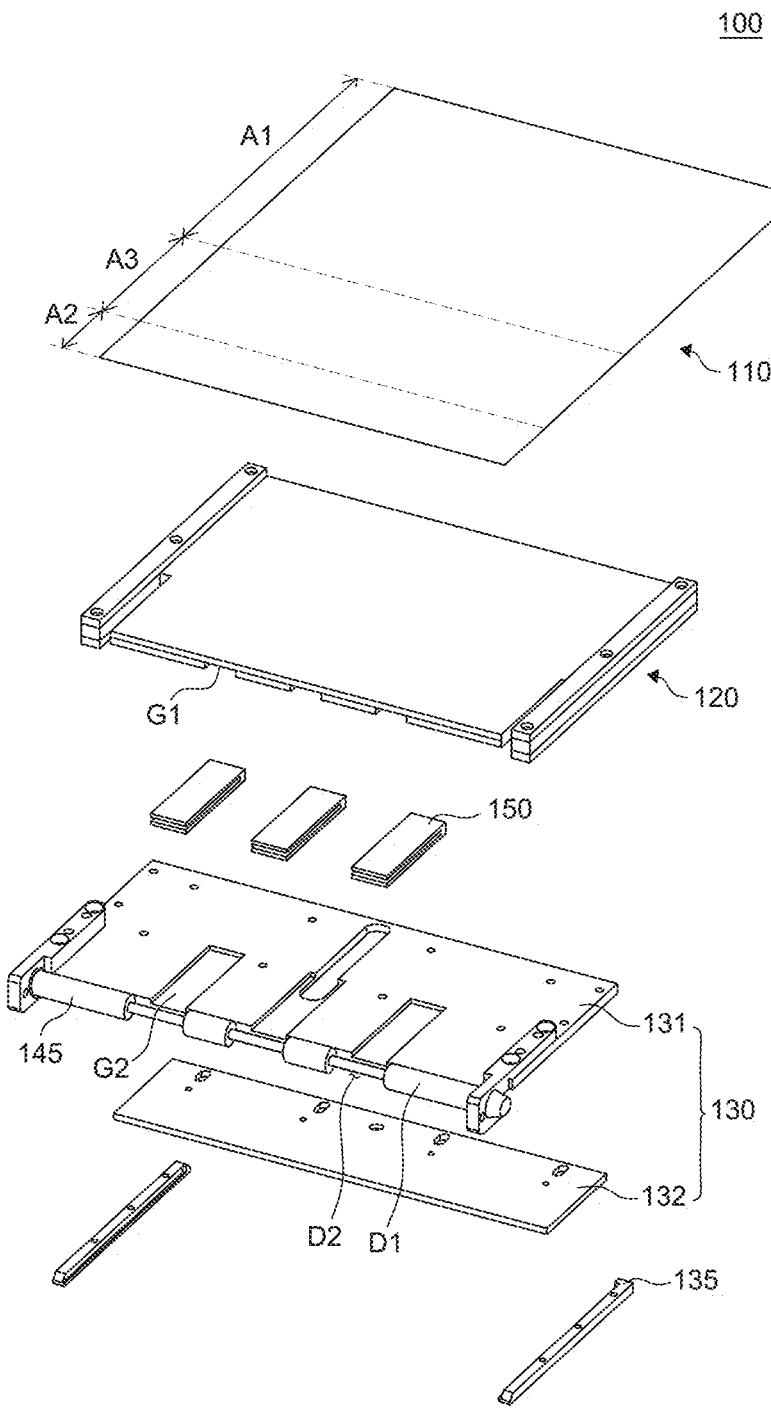
FIG. 1 is an exploded perspective view of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various exemplary embodiments of the present disclosure will be described in detail with reference to the accompanying drawings.

FIG. 1 is an exploded perspective view of a display device according to an exemplary embodiment of the present disclosure.

Referring to FIG. 1, a display device 100 includes a display panel 110, a frame 120, a slidable plate 130, a rotation shaft 145, a support guide 150 and slidable plate guides 135.

The display device 100 according to an exemplary embodiment of the present disclosure may be a slidable display device that may change the size of a screen of the display panel 110. For example, the display device 100 is formed as a slidable structure and may increase or decrease its screen size.

The size of the display panel 110 exposed on a front surface of the display device 100 may be defined as the size of the screen.

The display panel 110 is configured to display an image to a user and may be flexible. For example, the display panel 110 may be made of a flexible material that can be bent or folded.

The display panel 110 may include a display element for displaying an image, a driving element for driving the display element, a line for transmitting various signals to the display element and the driving element, and the like. The display element may be defined in different ways depending on the type of the display panel 110. For example, if the display panel 110 is an organic light emitting display panel, the display element may be an organic light emitting diode which includes an anode, an emission layer and a cathode. For example, if the display panel 110 is a liquid crystal display panel, the display element may be a liquid crystal display element.

Hereinafter, even though the display panel 110 is described as an organic light emitting display panel as an example, the display panel 110 is not limited to the organic light emitting display panel.

The display panel 110 may include a front surface and a back surface opposite to each other and may be divided into at 1 east a first area A1, a second area A2 and a third area A3 between the first area A1 and the second area A2. In other word s, the display panel 110 may include a first area A1, a second area A2 and a third area A3 between the first area A1 and the second area A2.

At least a part of the display panel 110 may be bent in a specific area.

The first area A1 is an area where an image is displayed in the display panel 110. The first area A1 may be fixed on the front surface of the display device 100.

In the first area A1, a plurality of sub-pixels constituting a plurality of pixels and a circuit for driving the plurality of sub-pixels may be disposed. The plurality of sub-pixels represents minimum units of the first area A1, and a display element may be disposed in each of the plurality of sub-pixels. Also, the plurality of sub-pixels may form a pixel. For example, an organic light emitting diode including an anode, an emission layer and a cathode may be disposed in each of the plurality of sub-pixels, but it is not limited thereto. Further, the circuit for driving the plurality of sub-pixels may include a driving element, a line, and the like. For example, the circuit may be composed of a thin film transistor, a storage capacitor, a gate line, a data line, and the like, but is not limited thereto.

The second area A2 is an area where an image is not displayed, e.g. the second area A2 may be a non-display area.

The second area A2 may be fixed on a back surface of the slidable plate 130 to be described later. For example, the second area A2 may be fixed on a back surface of a second slidable plate 132 of the slidable plate 130 facing away from a first slidable plate 131. The second area A2 of the display panel 110 fixed on the back surface of the slidable plate 130 may not be exposed to the front surface of the display device 100 even when the slidable plate 130 is slid in a first mode or a second mode.

The third area A3 is an area where an image is displayed in the display panel 110.

A plurality of sub-pixels constituting a plurality of pixels and a circuit for driving the plurality of sub-pixels may be disposed in the third area A3 as in the first area A1.

The third area A3 may be an area in which the display panel 110 is bendable. The third area A3 is an area where at least a part of the display panel 110 is bent. When the display device is switched to the first mode or the second mode, the size of the third area A3 exposed to the front surface of the display device 100 may be changed. For example, a part of the third area A3 may be bent and the size of the exposed third area A3 may be changed depending on a bending position. The bending position of the third area A3, i.e. the bending position of the display panel 110 in the third area A3, may be changed as the slidable plate 130 is slid. Details thereof will be described later.

The display device 100 may further include various additional components for generating various signals or driving pixels disposed in the first area A1 or the third area A3. The additional components for driving the pixels may include an inverter circuit, a multiplexer, an electro static discharge (ESD) circuit, etc. The display device 100 may also include additional components associated with functionalities other than for driving the pixels. For example, the display device 100 may further include additional components for providing a touch sensing functionality, a user authentication functionality (e.g., fingerprint scan), a multi-level pressure sensing functionality, a tactile feedback functionality, etc. The above-described additional components may be located in the second area A2 and/or an external circuit connected to a connection interface.

The frame 120 is disposed on a back surface of the display panel 110. Particularly, the frame 120 may be disposed to overlap the first area A1 of the display panel 110 and may support the first area A1.

The frame 120 may fix one side of the display panel 110. For example, one side of the first area A1 of the display panel 110 may be fixed to the frame 120. For example, even when the display device 100 is slid, the first area A1 may always be fixed on the front surface of the display device 100.

The slidable plate 130 may be disposed on a back surface of the frame 120 to overlap, at least in part, the frame 120. The slidable plate 130 may be slidable along one direction. For example, the slidable plate 130 is configured to be slid to switch the display device 100 to the first mode or the second mode. The slidable plate 130 may slide relative to the frame 120.

The slidable plate 130 may be composed of a first slidable plate 131 disposed on the back surface of the frame 120 and a second slidable plate 132 disposed on a back surface of the first slidable plate 131. The first slidable plate 131 and the second slidable plate 132 may slide relative to each other.

Although not illustrated in the drawings, a cover may be further provided under the slidable plate 130. The cover may be coupled to the frame 120 and the slidable plate 130 to protect the display device 100.

The slidable plate guides 135 may be further disposed at respective lower sides of the slidable plate 130 so as to face each other. A specific shape of the slidable plate guides 135 will be described later.

The rotation shaft 145 which is disposed to be rotatable may be disposed on one side of the slidable plate 130. The rotation shaft 145 may be rotatably disposed on one side of the first slidable plate 131. The rotation shaft 145 may have a specific curvature, and the display panel 110 may be bent at a specific curvature along with the rotation shaft 145.

The rotation shaft 145 may include a first part D1 having a first diameter and a second part D2 having a second diameter smaller than the first diameter.

The slidable plate 130 may be slid in the first mode or the second mode according to a rotation direction of the rotation shaft 145.

The sliding of the slidable plate 130 in the first mode or the second mode will be described later with reference to FIG. 2A to FIG. 3B.

The support guide 150 may be disposed between the frame 120 and the slidable plate 130.

For example, a groove G1 where the support guide 150 is accommodated may be disposed on one side of the frame 120. The back surface of the frame 120 facing away from the display panel 110 may include the groove G1. The width and the length of the groove G1 disposed in the frame 120 may be equal to respectively the width and the length of the support guide 150.

When the display device 100 is slid in the first mode or the second mode, the support guide 150 may be pulled into the groove G1 of the frame 120 or may be slid and withdrawn from the groove G1 of the frame 120.

Accordingly, a step difference caused by the disposition of the support guide 150 does not occur in the display panel 110.

A groove G2 may be disposed on one side of the slidable plate 130 in contact with one side of the frame 120 so as to correspond to the groove G1 disposed in the frame 120. In particular, the first slidable plate 131 may include a front surface in contact with the back surface of the frame 120, and the front surface of the first slidable plate 131 may include the groove G2.

The support guide 150 may be fixed to the groove G2 of the slidable plate 130. Therefore, when the slidable plate 130 is slid in the first mode or the second mode, the support guide 150 may be fixed to the slidable plate 130 and slid together with the slidable plate 130.

Hereinafter, the display device in the first mode will be described with reference to FIG. 2A through FIG. 2C.

Figure 2A:
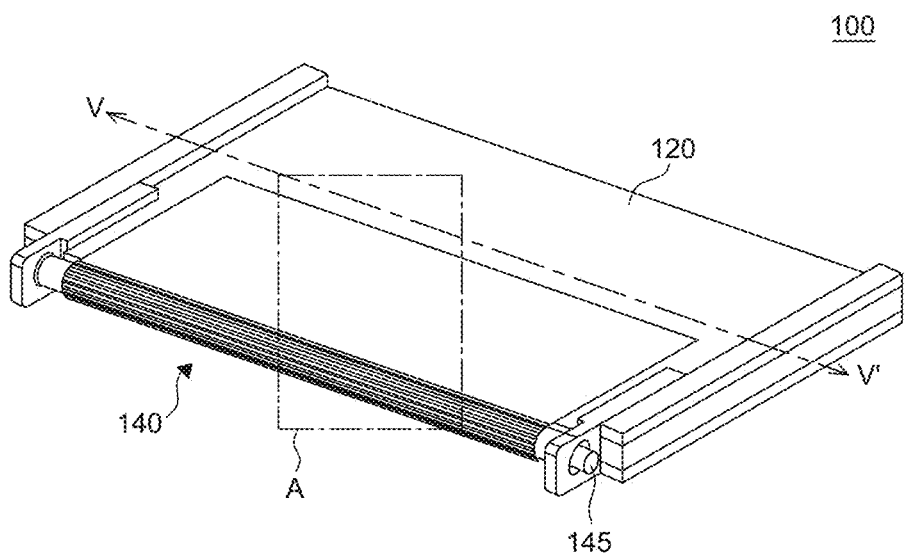
FIG. 2A is a perspective view illustrating the display device according to an exemplary embodiment of the present disclosure in a first mode.

FIG. 2A is a perspective view illustrating the display device according to an exemplary embodiment of the present disclosure in the first mode. FIG. 2B is an enlarged perspective view of an area A of FIG. 2A. FIG. 2C is a cross-sectional view as taken along a line II-II' of FIG. 2B.

The display device 100 according to an exemplary embodiment of the present disclosure is formed as a slidable structure and may increase or decrease its screen size. For example, FIG. 2A illustrates the first mode in which the screen of the display device 100 is reduced to a minimum size. The first mode of the display device 100 may also be referred to as "closed state" or "normal state".

Figure 2B:
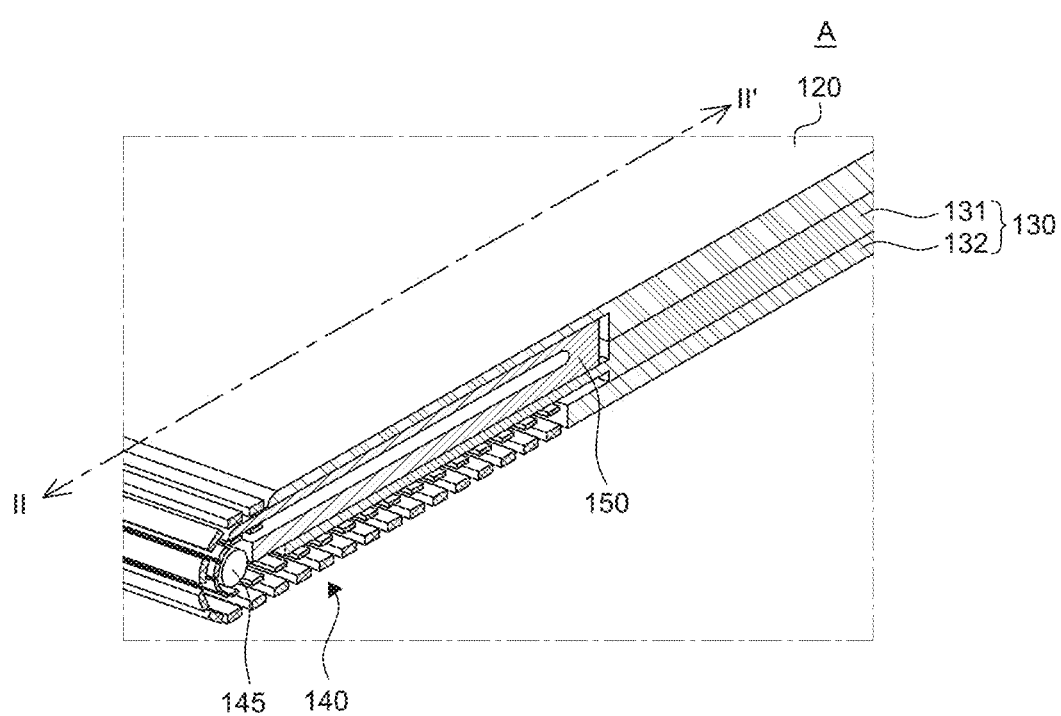
FIG. 2B is an enlarged perspective view of an area A of FIG. 2A.
Figure 2C:
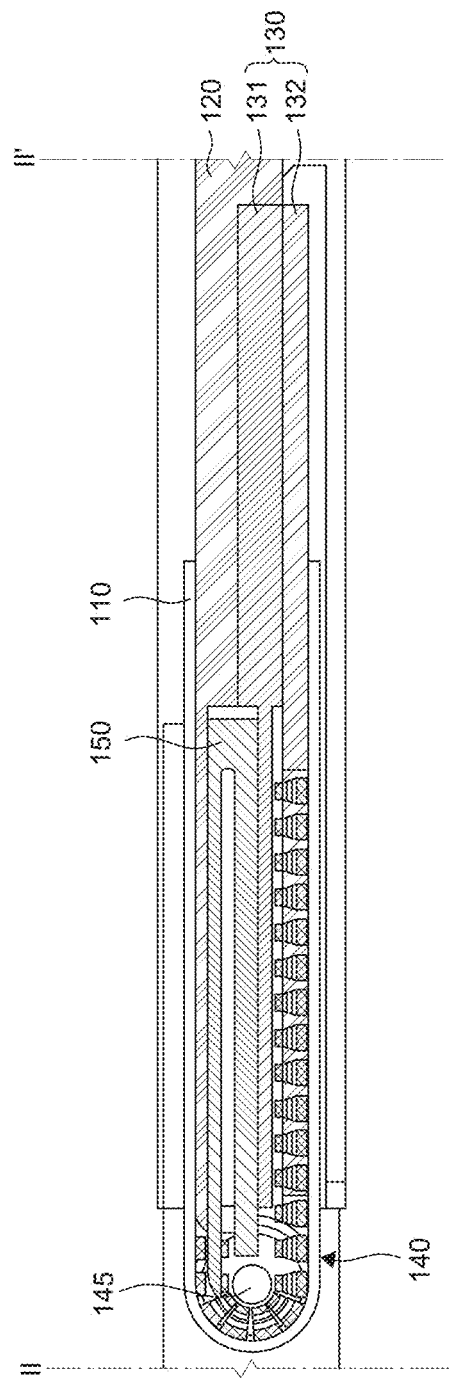
FIG. 2C is a cross-sectional view as taken along a line II-II' of FIG. 2B.

Referring to FIG. 2A through FIG. 2C together with FIG. 1, the display device 100 includes a slidable structure 140 including a plurality of roll belts. The plurality of roll belts is disposed on the rotation shaft 145 so as to wrap around at least a part of the rotation shaft 145. Also, one sides of the plurality of roll belts are connected to a side surface of the frame 120, and the other sides are connected to a side surface of the second slidable plate 132.

The slidable structure 140 may move according to the rotation direction of the rotation shaft 145. Also, the slidable structure 140 including the plurality of roll belts and the slidable plate 130 connected to the other side of the slidable structure 140 may be slid in the first mode or the second mode according to the rotation direction of the rotation shaft 145.

For example, when the rotation shaft 145 is rotated to switch the display device 100 to the first mode, the slidable plate 130 may be pulled into the frame 120 and the first area A1 may be exposed to the outside. Also, a part of the third area A3 may be bent around the rotation shaft 145 and disposed inside the display device 100. For example, in the first mode, the size of the display panel 110 exposed on the front surface of the display device 100 may be minimized.

In the first mode, a bending position where the display panel 110 is bent in the third area A3 may be adjacent to the first area A1. A part of the third area A3 adjacent to the first area A1 based on the bending position may be exposed to the front surface of the display device 100. Also, a part of the third area A3 adjacent to the second area A2 may be disposed inside the display device 100.

When the display device 100 is slid in the first mode or the second mode, the display panel 110 may be lifted off in at least a bending part of the display panel 110 due to a repulsive force between the roll belts and the display panel 110. If the display panel 110 is lifted off, there may be a difference in luminance. When the display device 100 is touched, the lifted part of the display panel 110 may be pressed, which results in a decrease in touch sensing capability or an operation failure.

Accordingly, in the display device 100 according to an exemplary embodiment of the present disclosure, the support guide 150 is disposed between the frame 120 and the slidable plate 130. Also, the support guide 150 is disposed to be coupled to the slidable structure 140 including the plurality of roll belts.

Therefore, even when the display device 100 is slid in the first mode or the second mode, the support guide 150 may support or restrain the slidable structure 140 including the plurality of roll belts. Thus, lift-off of the slidable structure 140 and the display panel 110 on the slidable structure 140 may be suppressed. Accordingly, it is possible to solve the decrease in touch sensing capability and the operation failure which may occur when the display panel 110 is lifted off.

The support guide 150 may be made of a hard material that is not deformed by an external force, and may be made of, for example, metal or plastic.

Hereinafter, the display device 100 in the second mode will be described with reference to FIG. 3A through FIG. 3C.

Figure 3A:
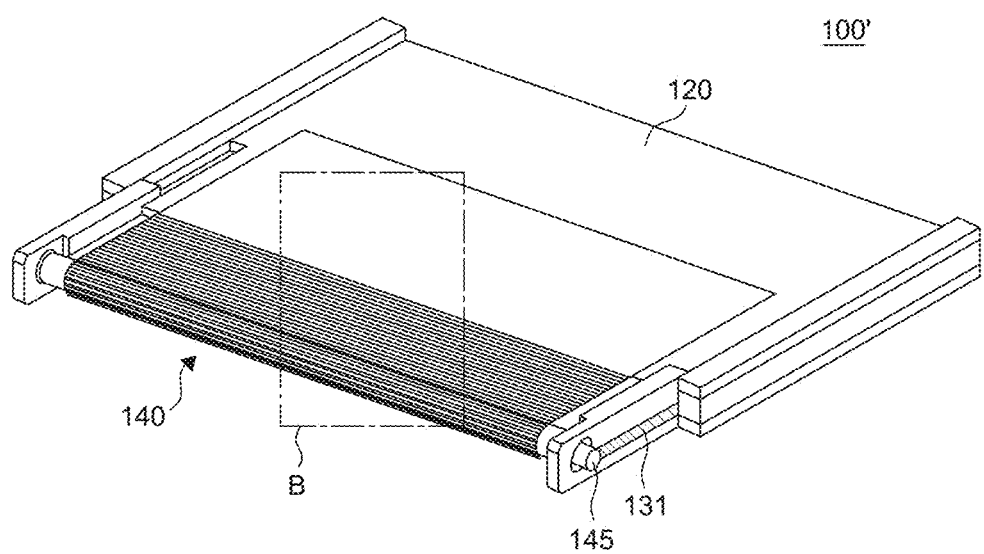
FIG. 3A is a perspective view illustrating the display device according to an exemplary embodiment of the present disclosure in a second mode.

FIG. 3A is a perspective view illustrating the display device according to an exemplary embodiment of the present disclosure in the second mode. FIG. 3B is an enlarged perspective view of an area B of FIG. 3A. FIG. 3C is a cross-sectional view as taken along a line III-III' of FIG. 3B.

FIG. 3A illustrates the second mode in which the screen of a display device 100' is increased to a maximum size. The second mode of the display device 100' may also be referred to as "open state" or "extended state".

For example, when the rotation shaft 145 is rotated to switch the display device 100' to the second mode, the slidable plate 130 may be withdrawn from an end portion of the frame 120 and may move toward the outside. Therefore, the third area A3 may be moved from the inside of the display device 100' to the front surface of the display device 100'. For example, in the second mode, the size of the display panel 110 exposed on the front surface of the display device 100 may be increased.

As the slidable plate 130 is slid, a bending position where the display panel 110 is bent may be changed.

For example, when the display device 100 is switched to the second mode from the first mode, the bending position where the display panel 110 is bent may be changed from a part of the third area A3 adjacent to the first area A1 to a part of the third area A3 adjacent to the second area A2. For example, when the display device 100 is switched to the first mode from the second mode, the bending position where the display panel 110 is bent may be changed from the part of the third area A3 adjacent to the second area A2 to the part of the third area A3 adjacent to the first area A1.

Based on the bending position of the display panel 110, the part of the third area A3 adjacent to the first area A1 is exposed to the front surface of the display device 100 and the part of the third area A3 adjacent to the second area A2 is disposed inside the display device 100. For example, the size of the third area A3 exposed on the front surface of the display device 100 may be changed and the screen size of the display device 100 may be increased or reduced depending on the bending position of the display panel 110.

According to an exemplary embodiment of the present disclosure, in the first mode and the second mode, the support guide 150 is disposed to be coupled to the slidable structure 140 including the plurality of roll belts. Thus, in the second mode in which the display device 100' is extended, the support guide 150 securely supports or restrains the slidable structure 140 including the plurality of roll belts even when the display device 100' is touched. Therefore, it is possible to suppress downward deformation caused by an external force.

Hereinafter, the shape of the slidable structure 140 will be described with reference to FIG. 4A and FIG. 4B.

Figure 4A:
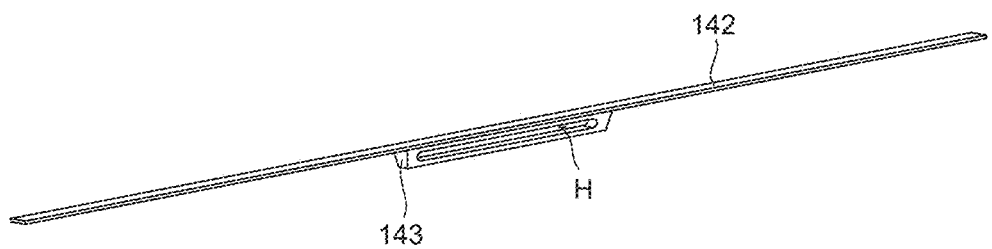
FIG. 4A is a perspective view of a roll belt according to an exemplary embodiment of the present disclosure.

FIG. 4A is a perspective view of a roll belt 141 included structure 140 according to an exemplary in the slidable embodiment of the present disclosure.

The roll belt 141 shown in FIG. 4A may be provided in plural in the slidable structure 140 according to an exemplary embodiment of the present disclosure. For example, the slidable structure 140 may be a structure in which a plurality of roll belts 141 is spaced apart from each other at a predetermined distance in one direction. The roll belts 141 may be a rail or ribs, but is not limited to the terms.

Each of the plurality of roll belts 141 included in the slidable structure 140 may include a bar 142 extending in a straight line. Also, each of the plurality of roll belts 141 includes a ring 143 extending from one surface of the bar 142 and providing an accommodation hole H to which the support guide 150 is coupled.

The support guide 150 according to an exemplary embodiment of the present disclosure may be coupled to the ring 143 that is disposed in each of the plurality of roll belts 141 included in the slidable structure 140 and provides the accommodation hole H.

For example, the width of the accommodation hole H may be equal to the width of the support guide 150.

Figure 3B:
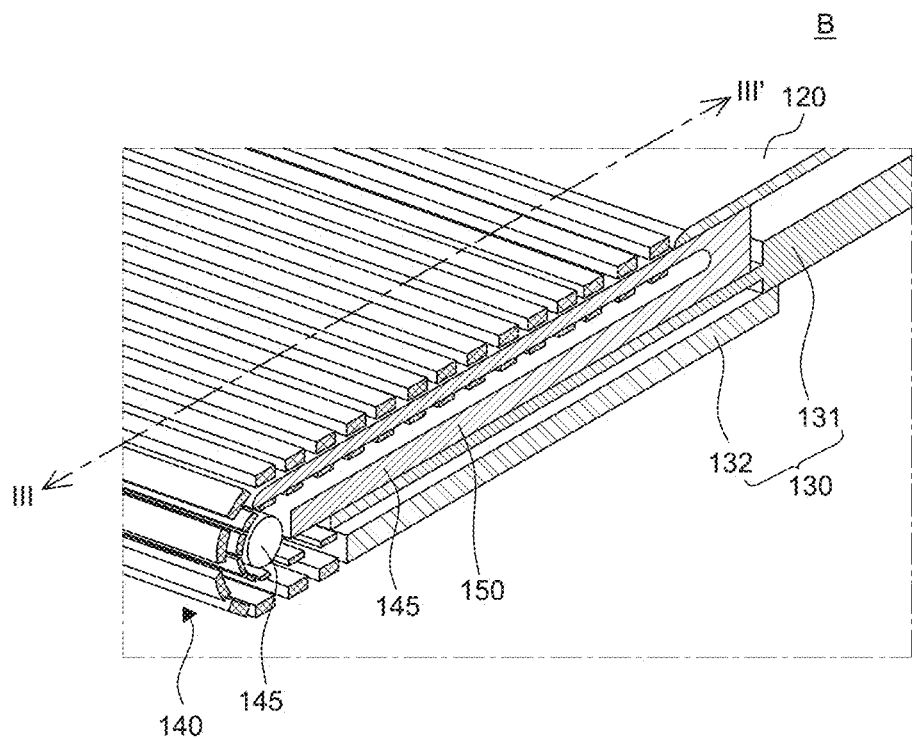
FIG. 3B is an enlarged perspective view of an area B of FIG. 3A.
Figure 3C:
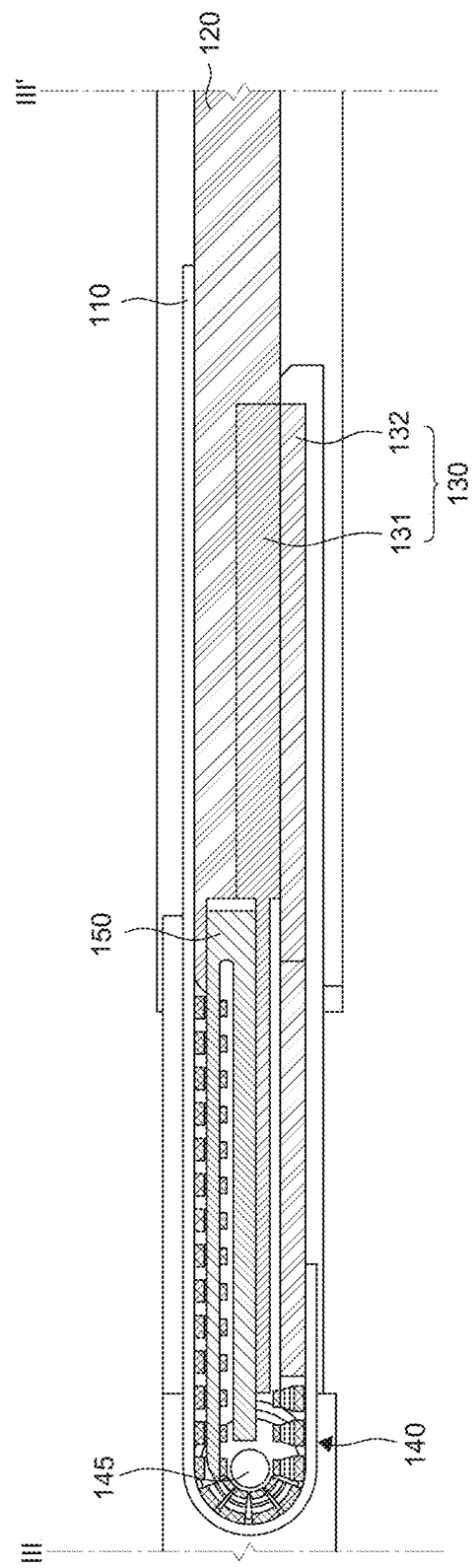
FIG. 3C is a cross-sectional view as taken along a line III-III' of FIG. 3B.

Referring to FIG. 2B and FIG. 3B together, the support guide 150 coupled to the accommodation hole H may have a "C" shape and include an upper portion and a lower portion mutually opposed and space apart from each other and a connection portion joining the upper portion and the lower portion. For example, the length of an upper surface of the support guide 150 having the "C" shape may be greater than the length of a lower surface of the support guide 150.

The upper surface of the support guide 150 may be inserted into the accommodation hole H of the ring 143 of each of the plurality of roll belts 141 included in the slidable structure 140. Also, the lower surface of the support guide 150 may be disposed under the ring 143 of each of the plurality of roll belts 141.

For example, the support guide 150 may be easily coupled to the slidable structure 140 including the plurality of roll belts 141 while being inserted into the ring 143 of each of the plurality of roll belts 141.

An edge of the upper surface of the support guide 150 inserted into the accommodation hole H in each of the plurality of roll belts 141 may be coupled to the second part D2 of the rotation shaft 145 disposed on one surface of the slidable plate 130. For example, the width of the second part D2 of the rotation shaft 145 may be equal to the width of the support guide 150.

The edge of the upper surface of the support guide 150 inserted into the accommodation hole H in each of the plurality of roll belts 141 may be coupled while it is engaged with an area where the curvature starts in the rotation shaft 145 disposed on one surface of the slidable plate 130. The lower surface of the support guide 150 may be disposed not to be directly coupled to the rotation shaft 145, but to support a lower part of the ring 143 of each of the plurality of roll belts 141. Accordingly, in an area where at least a part of the display panel 110 is bent, the support guide 150 may securely restrain the slidable structure 140 to suppress lift-off when the display device 100 is slid.

An edge of the support guide 150 coupled to the accommodation hole H in each of the plurality of roll belts 141, for example, the edge of the upper surface of the support guide 150 may have a wedge shape. Therefore, the support guide 150 may be more easily inserted into the accommodation hole H in each of the plurality of roll belts 141.

For example, the support guide 150 is fixed to the slidable plate 130 and thus may be moved together with the slidable plate 130 when the slidable plate 130 is slid in the first mode or the second mode. For example, as the slidable plate 130 is slid in the first mode and the second mode, a bending position where at least a part of the display panel 110 is disposed may be changed. Thus, the number of the plurality of roll belts 141 coupled to the support guide 150 may be changed. For example, in the first mode, a bending position where the display panel 110 is bent in the third area A3 is adjacent to the first area A1. Thus, the number of the plurality of roll belts 141 coupled to the support guide 150 may be minimized. In the second mode, a bending position where the display panel 110 is bent in the third area A3 is adjacent to the second area A2. Thus, the number of the plurality of roll belts 141 coupled to the support guide 150 may be maximized. However, the present disclosure is not limited thereto.

In the display device according to an exemplary embodiment of the present disclosure, the support guide 150 is disposed to be coupled to the slidable structure 140 including the plurality of roll belts 141 in an area where bending starts in the first mode or the second mode. Thus, even when the display device 100' is touched in the second mode in which the display device 100' is extended, the support guide 150 securely supports or restrains the slidable structure 140 including the plurality of roll belts 141. Therefore, it is possible to suppress downward deformation caused by an external force.

Figure 4B:
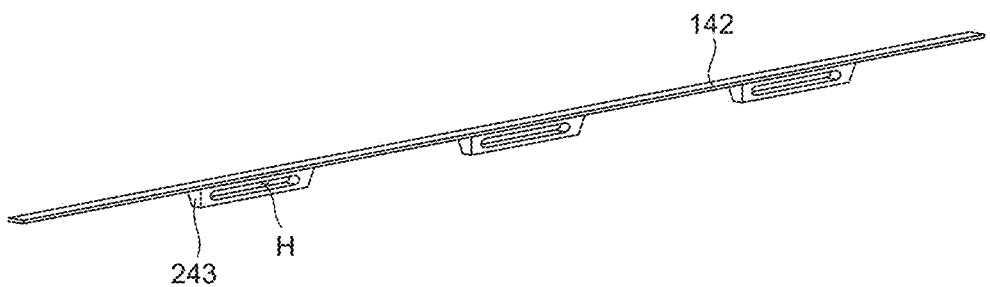
FIG. 4B is a perspective view of a roll belt according to another exemplary embodiment of the present disclosure.

FIG. 4B is a perspective view of a roll belt 241 included in a slidable structure 240 according to another exemplary embodiment of the present disclosure.

The slidable structure 240 illustrated in FIG. 4B is substantially the same as the slidable structure 140 illustrated in FIG. 4A except a plurality of rings 243 each providing the accommodation hole H.

The plurality of roll belts 241 included in the slidable structure 240 may include the plurality of rings 243 each providing the accommodation hole H to which the support guide 150 is coupled.

If there is the plurality of rings 243 each providing the accommodation hole H, the support guide 150 may also be provided in plural so as to correspond to each ring 243 and may be disposed to be coupled to each ring 243.

For example, if the plurality of roll belts 241 included in the slidable structure 240 includes the plurality of rings 243, a plurality of support guides 150 may support the slidable structure 240 when the display device 100 is slid in the first mode or the second mode. Thus, lift-off of the slidable structure 240 and the display panel 110 on the slidable structure 240 may be suppressed more easily. Also, the flatness of the display panel 110 may be improved.

If each of the plurality of roll belts 241 included in the slidable structure 240 includes the plurality of rings 243, the width of the accommodation hole H may be decreased as compared to a case where the plurality of roll belts 241 includes the single ring 143. Therefore, the width of the support guide 150 to be accommodated in the accommodation hole H may also be described. However, the present disclosure is not limited thereto.

Hereinafter, the shape of the slidable plate guides will be described with reference to FIG. 5A and FIG. 5B.

Figure 5A:
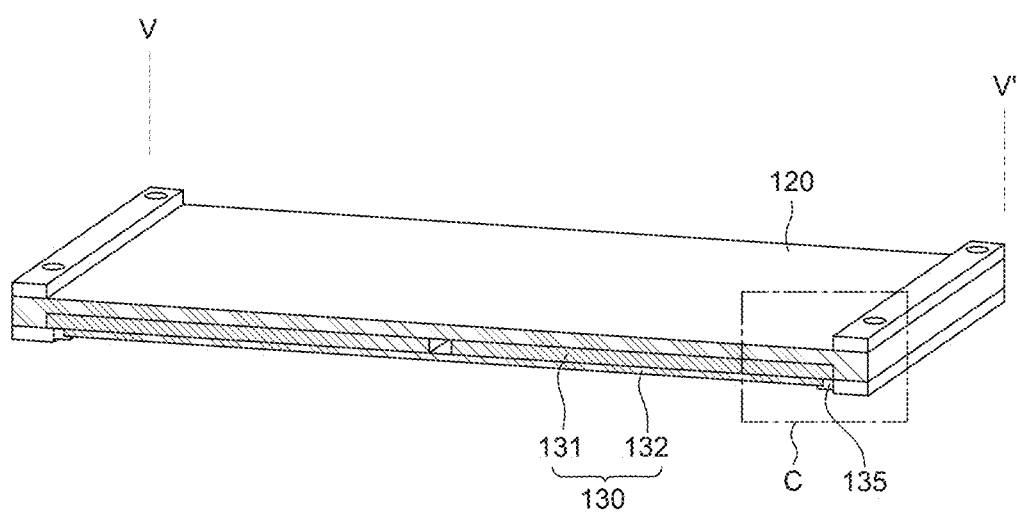
FIG. 5A is a cross-sectional view as taken along a line V-V' of FIG. 2A.

FIG. 5A is a cross-sectional view as taken along a line V-V' of FIG. 2A. FIG. 5B is an enlarged perspective view of an area C of FIG. 5A.

Figure 5B:
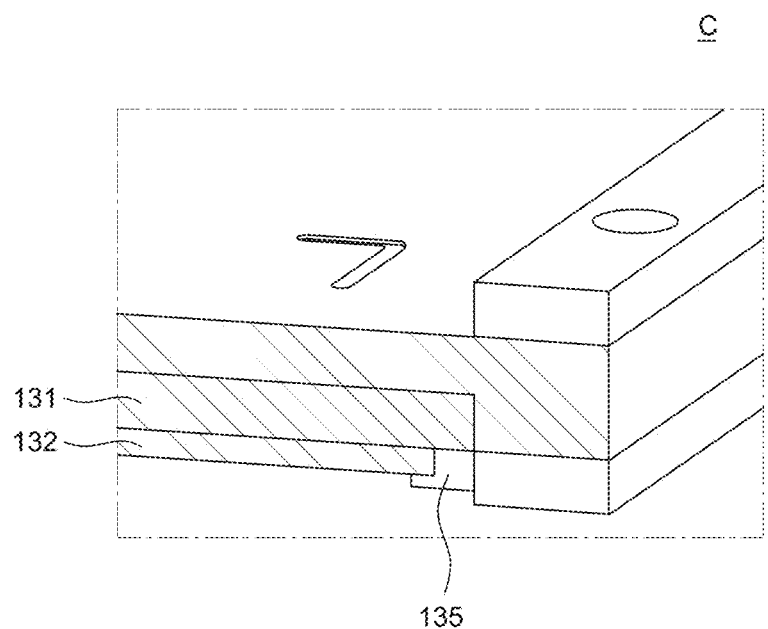
FIG. 5B is an enlarged perspective view of an area C of FIG. 5A.

Referring to FIG. 5A and FIG. 5B, the slidable plate guides 135 may be disposed at respective lower sides of the slidable plate 130 so as to face each other.

Specifically, the slidable plate 130 may include the first slidable plate 131 having a first width and the second slidable plate 132 having a second width smaller than the first width.

For example, one side of the slidable plate guide 135 may be disposed to be in contact with an edge of the second slidable plate 132, and the other side of the slidable plate guide 135 may share the edge with the first slidable plate 131.

The slidable plate guide 135 may further include a protruding surface protruding from one side of the slidable plate guide 135 and surrounding the second slidable plate 132.

For example, the second slidable plate 132 may be settled in an inner surface of the slidable plate guide 135 formed by one side of the slidable plate guide 135 and the protruding surface.

The height of the inner surface of the slidable plate guide 135 may be equal to the height of the second slidable plate 132. For example, the second slidable plate 132 may be settled in the inner surface of the slidable plate guide 135 and its movement may be guided by the protruding surface of the slidable plate guide 135.

Therefore, when the slidable structure 140 including the plurality of roll belts and the slidable plate 130 connected to the other side of the slidable structure 140 are slid in the first mode or the second mode according to the rotation direction of the rotation shaft 145, their movement may be stably guided by the slidable plate guides 135.

Figure 6:
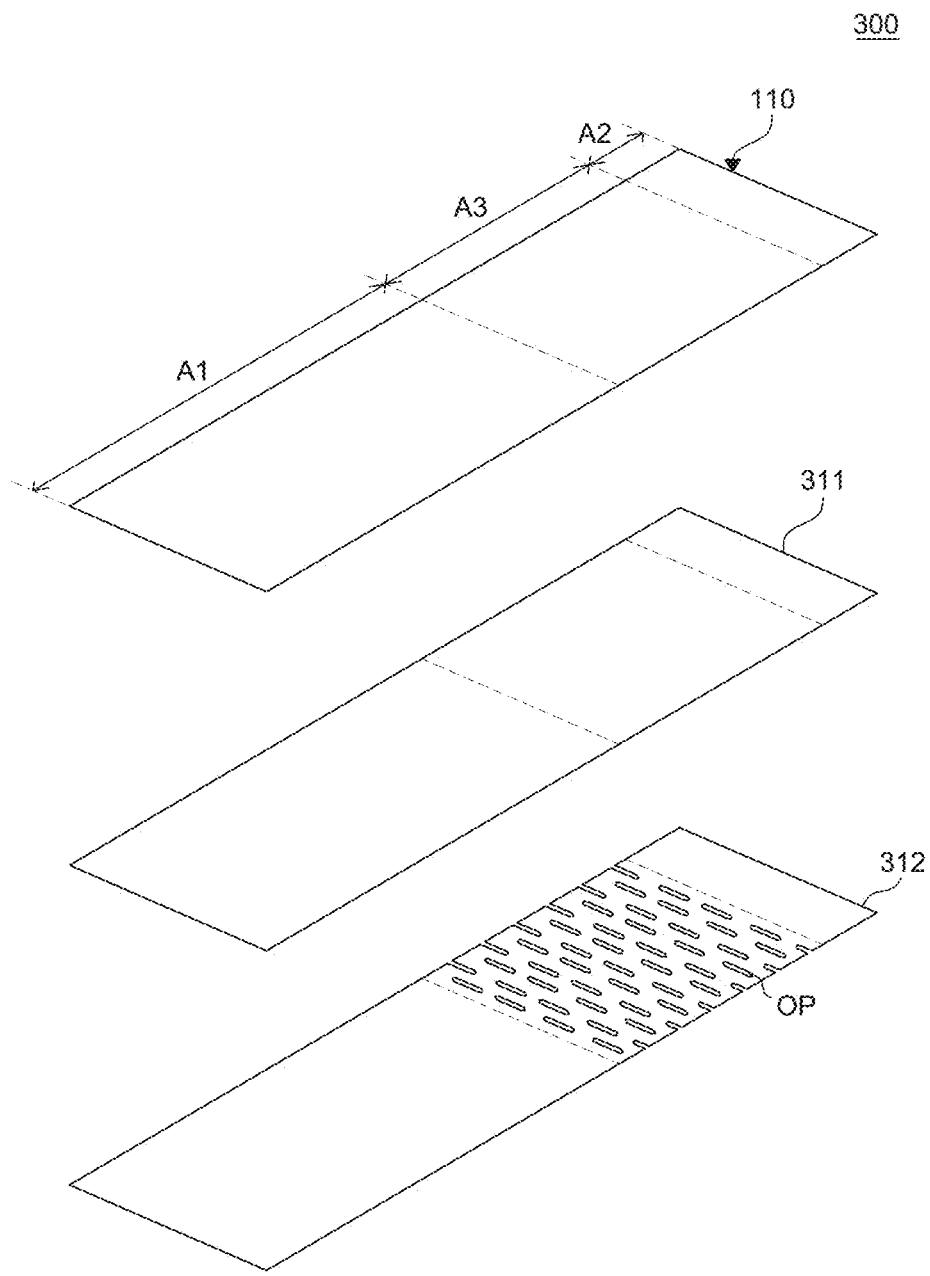
FIG. 6 is a perspective view of a display device according to another exemplary embodiment of the present disclosure.

FIG. 6 is a perspective view of a display device according to another exemplary embodiment of the present disclosure. A display device 300 illustrated in FIG. 6 is substantially the same as the display device 100 illustrated in FIG. 1 through FIG. 5B except that a support member is further disposed. Therefore, for the convenience of description, FIG. 6 illustrates only the display panel 110, a first support member 311 and a second support member 312 among the components of the display device 300, and a redundant description will be omitted. Referring to FIG. 6, the display device 300 according to another exemplary embodiment of the present disclosure further includes a support member disposed under the display panel 110 to support the display panel 110.

If the display panel 110 has flexibility, it may exhibit excellent bendability or foldability but has low hardness. Therefore, when the display device 300 is slid, it may be difficult to maintain the shape, and, thus, sagging may occur. Accordingly, in order to support the display panel 110, the first support member 311 and the second support member 312 are further disposed under the display panel 110.

The first support member 311 and the second support member 312 disposed under the display panel 110 supports the display panel 110 to suppress sagging or deformation. Also, the first support member 311 and the second support member 312 may protect the display panel 110 against external impacts or foreign matters.

The first support member 311 may be referred to as a top plate or a plate top, but is not limited thereto. The first support member 311 may support the display panel 110 and also block a plurality of holes OP formed in the second support member 312 so as not to be seen from the top of the display panel 110.

The first support member 311 may be made of any one of a polymer elastomer, a metal thin film or foam. For example, if the first support member 311 is a layer made of a polymer elastomer or foam, its impact resistance may be improved. For example, if the first support member 311 is a layer made of a polymer elastomer, the second support member 312 may fill in the plurality of holes OP to further secure hardness. Also, the second support member 312 may easily suppress introduction of foreign matters into the display device 300 through the plurality of holes OP of the second support member 312. For example, if the first support member 311 is a layer made of a metal film, its recovery properties may be improved.

The second support member 312 may be referred to as a bottom plate or a plate bottom, but is not limited thereto. The second support member 312 may include the plurality of holes OP formed corresponding to a sliding area of the display device 300 (e.g., the third area A3 of the display panel 110). Each of the plurality of holes OP may have a rectangular shape or a circular shape, but is not limited thereto. The plurality of holes OP may be disposed in parallel to each other in a first direction or a second direction or may be disposed to overlap each other in part, but is not limited thereto. The plurality of holes OP may improve flexibility of the support member. Thus, when the display panel 110 is bent (slid), the support member may also be easily bent (slid).

The second support member 312 may be made of stainless steel (SUS).

For example, SUS has high restoring force and high hardness, and, thus, the second support member 312 may have high hardness even if its thickness decreases. For example, the second support member 312 may support the display panel 110 and the first support member 311 and may also reduce the overall thickness of the display device 300.

The first support member 311 and the second support member 312 may be bonded by an adhesive, but the present disclosure is not limited thereto.

The slidable structure 140 including the plurality of roll belts and the frame 120 may be disposed on a back surface of the second support member 312 facing away from the first support member 311. For example, a part of the second support member 312 where the plurality of holes OP is disposed may be connected to the slidable structure 140 including the plurality of roll belts. In particular, the part of the second support member 312 where the plurality of holes OP is disposed may be connected to the rods 142 of the roll belts 141. In other words, the rods 142 of the roll belts 141 support the second support member 312 and thus support the display panel 110.

For example, the part of the second support member 312 where the plurality of holes OP is disposed may be bonded to the slidable structure 140 including the plurality of roll belts by an adhesive. In this case, the adhesive disposed between the second support member 312 and the slidable structure 140 may have the same shape as the plurality of roll belts.

According to anther exemplary embodiment of the present disclosure, the first support member 311 and the second support member 312 are further provided under the display panel 110. Thus, it is possible to more securely support the display panel 110.

In the display device 300 according to another exemplary embodiment of the present disclosure, the first support member 311 and the second support member 312 are disposed on the back surface of the display panel 110 to further support the display panel 110. Also, the support guide 150 securely restrains the slidable structure 140 in an area where at least a part of the display panel 110 is bent. Therefore, when the display device 300 is slid, lift-off may be further suppressed.

A display device according to various exemplary embodiments of the present disclosure may be described as follows.

A display device according to an exemplary embodiment of the present disclosure includes a display panel including a first area, a second area and a third area between the first area and the second area. Also, the display device includes a frame disposed on a back surface of the display panel to overlap the first area. Further, the display device includes a slidable plate disposed to overlap, at least in part, the frame and configured to slide in a first mode and a second mode. Furthermore, the display device includes a slidable structure whose one side is connected to a side surface of the frame and which includes a plurality of roll belts which overlaps the third area and is spaced apart from each other at a predetermined distance in one direction on the back surface of the display panel. Also, the display device includes a support guide disposed between the frame and the slidable plate. Each of the plurality of roll belts includes a bar extending in a straight line and a ring extending from one surface of the bar and providing an accommodation hole to which the support guide is coupled.

According to another feature of the present disclosure, the slidable plate may be composed of a first slidable plate disposed on a back surface of the frame and a second slidable plate disposed on a back surface of the first slidable plate. The other side of the slidable structure may be connected to a sides surface of the second slidable plate.

According to yet another feature of the present disclosure, the display device further includes a rotation shaft which is rotatably disposed on one side surface of the slidable plate. The slidable plate may be slid in the first mode or the second mode according to a rotation direction of the rotation shaft.

According to still another feature of the present disclosure, the rotation shaft includes a first part having a first diameter and a second part having a second diameter smaller than the first diameter. The width of the second part may be equal to the width of the support guide, and the support guide may be coupled to the second part.

According to still another feature of the present disclosure, in the first mode, the slidable plate may be pulled into the frame and the first area may be exposed to the outside. In the second mode, the slidable plate may be withdrawn from the frame and the first area and the third area may be exposed to the outside.

According to still another feature of the present disclosure, each of one surface of the frame and one surface of the first slidable plate in contact with the one surface of the frame may include a groove where the support guide is accommodated.

According to still another feature of the present disclosure, the support guide coupled to the accommodation hole may have a "C" shape.

According to still another feature of the present disclosure, an edge of the support guide coupled to the accommodation hole may have a wedge shape.

According to still another feature of the present disclosure, the plurality of roll belts may include a plurality of rings each providing the accommodation hole to which the support guide is coupled.

According to still another feature of the present disclosure, the display device further includes a support member disposed under the display panel to support the display panel. The support member may include a first support member disposed under the display panel and a second support member disposed under the first support member. The second support member may include a plurality of holes in an area overlapping the third area.

According to still another feature of the present disclosure, the display device further includes an adhesive disposed in an area where the second support member overlaps the third area. The adhesive may have the same shape as the plurality of roll belts.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:
   a display panel including a first area, a second area and a third area between the first area and the second area;
   a frame disposed on a back surface of the display panel to overlap the first area;
   a slidable plate disposed to overlap, at least in part, the frame and configured to slide in a first mode and a second mode;
   a slidable structure whose one side is connected to a side surface of the frame and which includes a plurality of roll belts which overlaps the third area and is spaced apart from each other at a predetermined distance in one direction on the back surface of the display panel; and
   a support guide disposed between the frame and the slidable plate,
   wherein each of the plurality of roll belts includes a bar extending in a straight line and a ring extending from one surface of the bar and providing an accommodation hole to which the support guide is coupled.

2. The display device according to claim 1, wherein the slidable plate is composed of a first slidable plate disposed on a back surface of the frame and a second slidable plate disposed on a back surface of the first slidable plate, and
   the other side of the slidable structure is connected to a side surface of the second slidable plate.

3. The display device according to claim 2, wherein each of one surface of the frame and one surface of the first slidable plate in contact with the one surface of the frame includes a groove where the support guide is accommodated.

4. The display device according to claim 3, wherein the support guide is fixed to the groove of the first slidable plate, and wherein the support guide is pulled into the groove of the frame or withdrawn from the groove of the frame when the first slidable plate is slid into the first mode or the second mode.

5. The display device according to claim 2, wherein the first area is fixed to the frame and the second area is fixed to a back surface of the second slidable plate.

6. The display device according to claim 1, further comprising:
   a rotation shaft which is rotatably disposed on one side surface of the slidable plate,
   wherein the slidable plate is slid in the first mode or the second mode according to a rotation direction of the rotation shaft.

7. The display device according to claim 6, wherein the rotation shaft includes a first part having a first diameter and a second part having a second diameter smaller than the first diameter, and
   a width of the second part is equal to a width of the support guide, and
   the support guide is coupled to the second part.

8. The display device according to claim 6, wherein:
   the plurality of roll belts are disposed on the rotation shaft so as to wrap around at least a part of the rotation shaft, and
   the slidable structure including the plurality of roll belts and the slidable plate are slid into the first mode or the second mode according to a rotation direction of the rotation shaft.

9. The display device according to claim 1, wherein in the first mode, the slidable plate is pulled into the frame and the first area is exposed to outside, and
   in the second mode, the slidable plate is withdrawn from the frame and the first area and the third area are exposed to the outside.

10. The display device according to claim 1, wherein the support guide coupled to the accommodation hole has a "C" shape.

11. The display device according to claim 1, wherein an edge of the support guide coupled to the accommodation hole has a wedge shape.

12. The display device according to claim 1, wherein the plurality of roll belts includes a plurality of rings each providing the accommodation hole to which the support guide is coupled.

13. The display device according to claim 1, further comprising:
- a support member disposed under the display panel to support the display panel,
- wherein the support member includes a first support member disposed under the display panel and a second support member disposed under the first support member, and
- the second support member includes a plurality of holes in an area overlapping the third area.

14. The display device according to claim 13, further comprising:
- an adhesive disposed in an area where the second support member overlaps the third area,
- wherein the adhesive has a same shape as the plurality of roll belts, and wherein the part of the second support member including the plurality of holes is bonded to the slidable structure including the plurality of roll belts by the adhesive.

* * * * *